Patented Oct. 6, 1953

2,654,764

UNITED STATES PATENT OFFICE 2,654,764

PYRROLIDINE ANALGESIC

Carl von Seemann and Gordon A. Grant, Montreal, Quebec, Canada, assignors to Ayerst, McKenna & Harrison, Limited, St. Laurent, Quebec, Canada, a corporation of Canada No Drawing. Application September 12, 1950, Serial No. 184,517. In Canada August 28, 1950

1 Claim. (Cl. 260—326.5)

This invention relates to a new chemical compound which is effective as a sedative.

The new compound is 2,4-dioxo-3-ethyl-3-($\beta$-ethoxyethyl)-pyrrolidine of the general formula

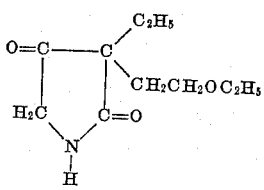

According to the invention this compound is prepared by reacting an alkyl $\alpha$-ethyl-$\alpha$-($\beta$-ethoxyethyl) $\gamma$-halogen-acetoacetate with ammonia, preferably in the presence of a mutual solvent, for example alcohol, by choice methyl alcohol. The solvent is preferably anhydrous.

The reaction is carried out in a closed system to prevent the escape of the ammonia. The preferred acetoacetate is ethyl $\alpha$-ethyl-$\alpha$-($\beta$-ethoxyethyl) $\gamma$-bromo-acetoacetate (T. S. Work, Jour. Chem. Soc. 1946, 194).

The charge is heated preferably to a temperature within the range from about 65° C. to about 66° C. for about 24 hours. The charge is then cooled and the solvent is evaporated in vacuo. 2,4-dioxo-3-ethyl-3-($\beta$-ethoxyethyl)-pyrrolidine and ammonium bromide are formed in the reaction, and remain as a residual mixture after evaporation.

The pyrrolidine may be extracted from the residual mixture with a solvent, hexane preferred, the extract evaporated and the residue distilled in vacuo to yield the crude pyrrolidine in crystalline form. The latter can be recrystallized from hexane and the pure substance obtained as colorless crystals.

The new compounds have highly effective sedative properties and low toxicity. They are highly soluble in water and thus are ingested rapidly. The active substance may be put up in dosage units for example tablets or capsules. In the case of a tablet the substance should be mixed with an excipient, for example lactose or starch.

Example

In order to further demonstrate the invention, the following specific example will be given of one method of its operation.

Ethyl $\alpha$-ethyl-$\alpha$-($\beta$-ethoxyethyl) $\gamma$-bromo-acetoacetate (1.5 g.) was dissolved in a mixture of 45 cc. anhydrous methanol and 11 g. of liquid ammonia (which can be prepared by introducing ammonia gas into the alcohol with cooling in Dry Ice). The container was sealed and heated to 65° C. to 66° C. for 24 hours. The contents were then cooled in ice and the solvents evaporated in vacuo. The residue was continuously extracted with hexane in order to separate 2,4-dioxo - 3 - ethyl - 3 - ($\beta$ - ethoxyethyl) - pyrrolidine from the accompanying ammonium bromide. The hexane extracts were evaporated and the residue distilled in vacuo, yielding the crude 2,4-dioxo-3-ethyl-3-($\beta$-ethoxyethyl)-pyrrolidine in crystalline form. The latter was recrystallized from hexane and the pure substance 2,4 - dioxo - 3 - ethyl - 3 - ($\beta$ - ethoxyethyl)-pyrrolidine obtained in colourless crystals, M. P. 81.5° C.–82.5° C. It is freely soluble in water, lower alcohols, acetone and ethylene dichloride and moderately soluble in hexane.

For $C_{10}H_{17}O_3N$ (199)
Calculated: C, 60.26%  H: 8.60%  N: 7.03%
Found:      C, 59.87%  H: 8.33%  N: 7.24%
            60.17%     8.58%

This compound was found to have sedative properties.

We claim:

The compound 2,4-dioxo-3-ethyl-3-($\beta$-ethoxyethyl)-pyrrolidine.

CARL VON SEEMANN.
GORDON A. GRANT.

References Cited in the file of this patent

UNITED STATES PATENTS

| Number | Name | Date |
|---|---|---|
| 2,328,232 | Schnider | Aug. 31, 1943 |